Feb. 10, 1959  P. SCHMIDT  2,872,780
PULSE JET ENGINE WITH ACCELERATION CHAMBER
Filed April 7, 1953  3 Sheets-Sheet 1

Feb. 10, 1959 P. SCHMIDT 2,872,780
PULSE JET ENGINE WITH ACCELERATION CHAMBER
Filed April 7, 1953 3 Sheets-Sheet 2

United States Patent Office 2,872,780
Patented Feb. 10, 1959

2,872,780

PULSE JET ENGINE WITH ACCELERATION CHAMBER

Paul Schmidt, Munich, Germany

Application April 7, 1953, Serial No. 347,274

Claims priority, application Germany April 12, 1952

4 Claims. (Cl. 60—35.6)

This invention relates to a pulse jet engine including a combustion chamber and an acceleration chamber extending past the outlet opening of the former, each of said chambers having valve members at its respective inlet opening and including such structural components that there is formed a gas column in the acceleration chamber portion between the acceleration chamber inlet valves and the combustion chamber outlet opening and that there is brought about the resonance of the vibration frequency thereof with the frequency of the pulsations of the burned gases in the combustion chamber.

The pulse jet engine of this invention is one in which there is an intermittently operating combustion chamber, which together with the other set forth components, hereinafter set forth, forms a continuously operating internal combustion engine having an open combustion chamber without any sliding pistons and in which there is a constant volume combustion of the fuel mixture, even though the inflow of the fuel mixture is periodic. The pulse jet engine here comprises an elongated acceleration chamber surrounding the outlet end of the combustion chamber, said acceleration chamber having at its intake or inlet valve means controlling the inlet opening for admitting combustion supporting gas into the acceleration chamber in timed relation to the periodic discharge of burned gases from the combustion chamber at its outlet opening and in accordance with the difference in pressures on both sides of said valve means and for reflecting pressure waves created in the acceleration chamber. This valve means is spaced upstream from the outlet of the combustion chamber at such a distance that the combustion supporting gas, viz. air, between the inlet opening of the acceleration chamber and the outlet opening of the combustion chamber pulsates with a natural frequency equal to the frequency of pressure impulses received from the periodic discharges of the burned gases from the outlet opening of the combustion chamber. In other words, the valve means reflects pressure waves and simultaneously controls the admission of the combustion supporting gas in dependence on differences of pressures on both sides thereof and is so spaced from the outlet of the combustion chamber that in the gas column, bounded by the valve means at the acceleration chamber intake and by the combustion chamber outlet, resonating pulsations are generated by the periodical pressure impulses of the burned gases streaming out of the combustion chamber and are maintained with the frequency of the pressure impulses. Because of the natural frequency resonance in the aforesaid portion of the acceleration chamber, without this novel combination of component parts there will be back suction into the combustion chamber at its outlet. This novel combination of component parts prevents such back suction, and, also, the transitory storage of energy in the pulsating gas masses in the acceleration chamber equalizes the energy at the combustion chamber outlet appearing in impulses, and thus there is a greater efficiency brought about with respect to the fuel consumed.

This pulse jet engine has positioned adjacent to the combustion chamber inlet a means for intermittently supplying a starting fuel and gas mixture thereto at a pressure higher than atmospheric pressure, a sparking means for igniting said mixture and means for supplying the main fuel to the combustion chamber, whereby subsequent charges of the fuel and air mixture are drawn into the combustion chamber and are ignited by shock waves therein. The valve means heretofore set forth include plate members freely oscillating about a central point. Also, this pulse jet engine includes a tubular member surrounding both said combustion chamber and acceleration chamber which has an inlet opening at one end thereof spaced from the inlet opening of the combustion chamber and the inlet opening of the acceleration chamber. This tubular member is sealingly connected at its other end to the outer wall surface of the acceleration chamber, and air passes through the inlet opening of said tubular member and thence through the combustion chamber and acceleration chamber inlet openings to operate the respective valve means attached to said chambers at their respective inlet openings in accordance with the pressures existing on both sides of each valve means.

To obtain a high efficiency, the mixture of the fuel and combustion supporting gas, viz. oxygen, is preferably ignited while at a pressure higher than atmospheric pressure. Said mixture is forced into the combustion chamber at such increased pressure by means of a compressor, and at this increased pressure upon the said mixture being ignited there will take place a constant volume combustion as occurs within the cylinders of combustion motors. The mixture being intermittently supplied to the combustion chamber is ignited, and there are formed hot combustion gases which pass towards the outlet of the combustion chamber. These burned gases leaving the combustion chamber are conducted into the elongated acceleration chamber open at its outlet and provided with valve means at its inlet for intermittent introduction of a gas, viz., air, thereinto, the latter being preferably colder than the combustion gases. The combustion chamber also has a main fuel supply means, and subsequent charges of the fuel and air mixture are drawn thereinto and are ignited by shock waves therein. As previously set forth, the valve means at the inlet opening of the acceleration chamber is spaced upstream from the combustion chamber outlet at such a distance that the gas column in the acceleration chamber between the inlet opening of the acceleration chamber and the outlet opening of the combustion chamber pulsates at its natural frequency equal to the frequency of the pressure impulses of the burned gases discharged from the combustion chamber.

An object of this invention is to provide a pulse jet engine having an acceleration chamber and an intermittently operating combustion chamber and constituting a continuously operating internal combustion engine having an open combustion chamber and without any sliding pistons, there being a constant volume combustion of the fuel mixture within said said combustion chamber although the fuel mixture inflow is periodic.

Another object of this invention is to provide a pulse jet engine wherein energy is produced by intermittently repeated combustions of ignitable mixture within an elongated combustion chamber open at its outlet and having at its inlet end control means for allowing combustion supporting gas to flow thereinto, said repeated combustions being initiated by shock-wave ignition.

Another object of this invention is to provide a pulse jet engine having an open combustion chamber without any pistons which permits the easy and safe burning of powdery and ash-containing fuels at high efficiency and allows utilization of the waste heat energy.

Other objects and features will become readily apparent from the following detailed description which is illustrative of the preferred embodiments of my invention.

Figure 1:
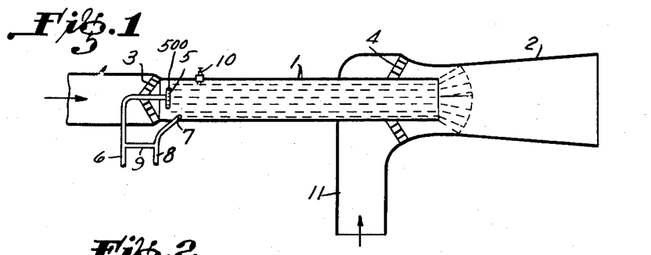
Figure 1 is a diagrammatic view through the combination of a tubular combustion chamber with an acceleration chamber of a pulse jet engine, said acceleration chamber being one into which additional gaseous medium is conducted at an increased pressure.

More specifically, referring to Figure 1, there is provided a tubular combustion chamber 1 and an acceleration chamber 2. At the inlet opening of the combustion chamber 1 is a plurality of back-pressure oscillatable rotary flap valves 3 controlling the flow of combustion supporting air into said chamber and at the inlet opening of the acceleration 2 is a plurality of back-pressure oscillatable rotary flap valves 4 controlling the flow of air or oxygen into the acceleration chamber 2. The fuel is introduced into the combustion chamber 1 through a plurality of nozzles 500 positioned within a plate-like hollow member 5 through line 6. Connected to line 6 is tube 9 which, in turn, is connected to line 8. Through line 8 is passed air at pressures above atmospheric pressure, and fuel is passed into 8 through tube 9 to form a mixture of fuel and combustion supporting gas. To operate the device, the fuel and air will be mixed within the line 8, and the air-fuel mixture will be introduced into the combustion chamber 1 in the form of a jet from nozzle 7 and will fill said combustion chamber 1. The flow of said mixture from nozzle 7 will then be stopped, and the mixture will be ignited by means of the spark plug 10. The combustion gases thereby formed will flow from the combustion chamber 1 through its open outlet end, thereby causing a drop of gas pressure within the combustion chamber 1 and the resultant suction of fresh air through the flap valves 3 into combustion chamber 1. With the so-introduced fresh air will be mixed a sufficient quantity of fuel required for forming an ignitable mixture, and said fuel will pass through line 6 and the nozzles 500 at member 5 and be radially injected through said nozzles 500 into the fresh air. After that portion of the combustion chamber adjacent its inlet opening will have been filled with the ignitable mixture, the said mixture will be ignited by means of the shock-wave formed in the course of the preceding efflux of the combustion gases at the combustion chamber outlet opening and expanded at a high velocity to the combustion chamber inlet portion. The ignition leads to an approximate constant-volume combustion of the mixture, and the subsequent efflux of the gases from the combustion chamber 2 develops a pressure front within the acceleration chamber 2, as shown by the plurality of flared broken lines outside of the combustion chamber 1 at its outlet opening, the combustion gas within the combustion chamber 1 being shown by the plurality of horizontal broken lines therewithin. This pressure front is momentarily developed in the course of the efflux of the combustion gases from the combustion chamber 1 and forms directly at the outlet of the combustion chamber and, under lateral broadening, expands towards the outlet of the acceleration chamber 2.

The distance between the outlet of acceleration chamber 2 and the outlet of combustion chamber 1 has been determined so that the gas within acceleration chamber 2 will pulsate in rhythm with the pulsating gas column within combustion chamber 1 with the result that, at the combustion chamber outlet, the accelerated gaseous medium within acceleration chamber 2 will be advancing towards the acceleration chamber outlet as the gas pressure at the combustion chamber outlet drops to low values, thereby starting the formation of a vacuum at the combustion chamber outlet which will be enhanced because of the movement of the gases towards the acceleration chamber outlet, thereby bringing about a condition favorable for the formation of the igniting shock-wave at the end of the combustion chamber 1, which wave subsequently will flow back into the combustion chamber. Air at pressures higher than atmospheric pressure will be conveyed through line 11 in the direction along the walls of the combustion chamber, and the outlet of the combustion chamber 1 will, after the drop in pressure of the gases at the inlet of the acceleration chamber 2, be surrounded by the air introduced through line 11, in the direction towards the outlet of the acceleration chamber 2. Because the so-introduced air through line 11 does travel towards the outlet of the acceleration chamber 2 through the valves 4 under a pressure greater than atmospheric, the velocity is such that only an infinitesimal portion of said gas is sucked back into combustion chamber 1, thereby supporting the formation of the igniting shock-wave. Further, because the so-introduced gas through 11 is under a pressure greater than atmospheric, a relatively large quantity of such gas does enter the acceleration chamber, and such a great volume of such gas, on one hand, increases the efficiency of a reaction force, viz. the production of a driving impulse, and, on the other hand, decreases the average temperature of the gases flowing from the outlet opening of the acceleration chamber 2, especially in view of the fact that said gas introduced through line 11 has a temperature lower than the temperature of the combustion gases.

In pulse jet engines for jet power plants and gas turbines, it is sometimes advisable and preferred that the cross sectional area of the acceleration chamber be increased with respect to the cross-sectional area of the combustion chamber to allow a quantity of combustion supporting gas, viz. air or oxygen, substantially greater than the quantity of fuel mixture to be introduced thereinto in order to obtain a greater quantity of energy from the initial charge upon ignition thereof.

Figure 2:
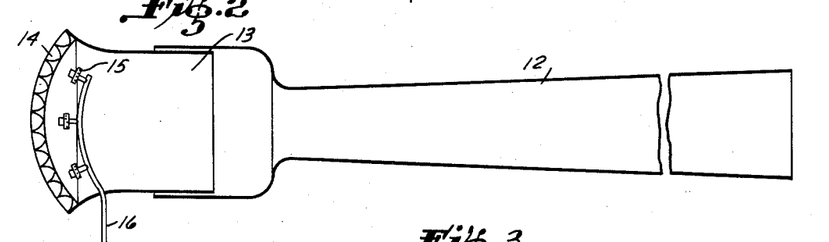
Figure 2 is a diagrammatic view through another embodiment of a tubular combustion chamber of a pulse jet engine, said chamber comprising a filling chamber at its outlet end having a cross section larger than the cross section of the remaining portion of the chamber and including control valve means at its end outlet opening.

Also, a large cross-sectional area at the inlet portion of the combustion chamber, in such an engine, will likewise be advantageous especially in view of the fact that the mixture to be initially ignited by the spark plug will not be subjected thereby to a pressure drop of any consequence at the inlet opening portion. However, the combustion chamber must decrease in cross-sectional area in the section thereof adjacent the section adjacent to the inlet opening to a relatively smaller cross-sectional area so that there will be in that portion thereof of smaller cross-sectional area a sufficiently high velocity of the gases and subsequently an efficient igniting shock-wave. Of course, these shock-waves are formed in accordance with the laws of thermodynamics as applied to gases and, of course, velocity of these gases is presumed to be high. However, it is preferable, under such conditions, to introduce the ignitable mixture into the combustion chamber at a low velocity in order to maintain the mixture at a high pressure. Thus, where high initial thrusts are desired, the fuel mixture should be under a pressure considerably higher than approximately 0.4 atmosphere, viz. an absolute pressure of approximately 0.6 atmosphere. In the embodiment of Figure 2, a filling chamber 13 axially slidable in the rear portion of the combustion chamber 12 and made a part thereof is shown. Filling chamber 13 is here utilized to receive the initial charge of fuel mixture and has a cross-sectional area larger than the other portions of said combustion chamber. Positioned within said filling chamber are the spaced plate-like hollow members 15 each having positioned therein a plurality of nozzles 500. The fuel is introduced into the chamber 13 through said nozzles connected with fuel line 16. The chamber 12 primarily receives the combustion gases resulting from the combustion taking place in chamber 13. The rotary flap valves 14, as previously set forth, are operable to permit the inflow combustion supporting gas, viz. air, therethrough. With this type of combustion chamber, there will be provided a large cross-sectional area at the inlet of chamber 13 which is part of the entire combustion chamber. The chamber 12 is so constructed that its cross-sectional area is sharply reduced at a portion thereof adjacent to chamber 13 and is of convergent-divergent shape for the remaining portion thereof to its outlet opening, the divergence of the walls thereof being at an angle of divergence of less than 5° thereby preventing considerable flow losses at the walls thereof. Thus, the chamber 12 is so constructed that it has a restricted cross-sectional area therein, and at said restricted portion the gases will be under a low pressure and at a relatively high velocity during the formation of the shock-wave. Since the fuel mixture at 13 will, because of the relatively large cross-sectional area of both the inlet opening of chamber 13 and of the chamber 13 itself, be so formed and since there will be a low pressure drop at said inlet portion, the fuel mixture will be at a pressure in said chamber 13 higher than the gas in the remaining portions of the combustion chamber including chamber 12. The maximum pressure of the combustion gases is approximately proportional to the initial pressure of the fuel mixture, so that there will result combustion gases passing from the combustion chamber at a higher pressure than the pressure of the fuel mixture without any backfire due to suction of the combustion gases back into the inlet portion of the combustion chamber, and this is so because of the particular pattern of cross-sectional areas utilized at different portions of the combustion chamber. Thus, greater efficiencies will be obtained, and larger quantities of fuel mixture will be capable of being successfully ignited.

To support the formation of the igniting shock-wave, it is further preferable to have the inlet-end and the outlet-end of an acceleration chamber so positioned at such a distance from the outlet opening of the combustion chamber that the gases in the annular space defined by the inner wall of the acceleration chamber and the outer wall of the combustion chamber pulsate in rhythm with the pulsating gas column of the combustion chamber. Because of the temporary compression and pulsation of the gases within that part of the acceleration chamber between its inlet opening and the combustion chamber outlet opening, there will be a flow of the gases therefrom after the occurrence of the pressure drop at the combustion chamber outlet. In such cases there will be a temporary flow of the gases from the combustion chamber. In the apparatus shown in Figure 1, such a flow results from the introduction of gaseous medium under a pressure higher than atmospheric through line 11.

Figure 3:
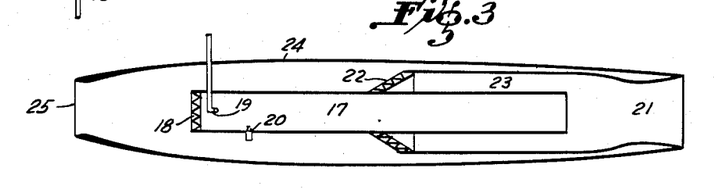
Figure 3 is a diagrammatic view through a pulse jet engine or jet power plant for airplanes or the like, said engine comprising a tubular compensating storage member positioned about said combination of the combustion chamber and the acceleration chamber, said member having an inlet opening at one end thereof spaced from the combustion chamber inlet opening and the acceleration chamber inlet opening and sealingly connected at its other end to the outer wall surface of the acceleration chamber.

Figure 3 shows diagrammatically a pulse jet engine used as a jet power plant for airplanes or the like. Here, the jet resulting from the combustion of the mixture of fuel and air by means of shock-wave ignition leaves the combustion chamber and accelerates the additional air which has been introduced into the acceleration chamber in large quantities. The inlet opening of the acceleration chamber is equipped with a plurality of valves and is intermediate the inlet and outlet openings of the combustion chamber, and the combustion chamber terminates at its outlet opening within the acceleration chamber, as clearly shown in Figure 3. That portion of the acceleration chamber defined by the inner wall thereof and the outer wall of the combustion chamber constituting an annular space may be referred to as a vibration chamber which discharges into the outlet portion of the acceleration chamber through which the combustion gases and additional air flow intermittently. The frequency at which the additional air naturally vibrates within that vibration chamber is approximately equal to the frequency of the combustions within said combustion chamber.

More specifically, referring to Figure 3, there is provided a combustion chamber 17 having at its outlet opening a plurality of elastic back-pressure flap valves 18. Forward of said valves is positioned fuel supply line 19 and spark plug 20 utilized only for initiating the combustion. After the starting of the combustion, the pulsation will be maintained within the combustion chamber 17 by means of the automatic sucking in of the combustion supporting air and the automatic ignition by means of shock-waves. Thus, the amount of fresh fuel mixture to be introduced into chamber 17 need only be a minimum, unless additional energy requirements are present. Additional air flows through valves 22 at the inlet opening of the acceleration chamber 21 and through the annular space 23, which is the vibration chamber. Since the annular space 23 opens into the forward portion of acceleration chamber 21, vibration within 23 will be enhanced. Air flows into the compensating storage tank 24 through its inlet opening 25, said tank 24 being tubular and surrounding acceleration chamber 21 and combustion chamber 17 and being sealingly connected to said acceleration chamber at its outlet opening, as clearly shown in Figure 3. Combustion chamber 17 and acceleration chamber 21, at its annular space 23, withdraw air intermittently from tank 24 through the valves 18 and 22, respectively.

The frequency of the pulsations of the gas column in chamber 23 must be adapted to the frequency of the combustions in chamber 17. The air within 23 will be momentarily compressed by the combustion gases passing from the combustion chamber at its outlet, while valves 22 remain closed. After the pressure of the combustion gases leaving the combustion chamber decreases as a result of said gases flowing at an increased velocity towards the outlet of acceleration chamber 21, valves 22 will automatically open as will valves 18. Thus, there will be attained a favorable acceleration of relatively large volumes of air and only a faintly pulsating flow of gases and air at the outlet of the acceleration chamber 21. In pulse jet engines heretofore known, there exists a highly pulsating flow of gases at the outlet of the jet unit.

In the course of the operation of a pulsatingly operating combustion chamber, especially a combustion chamber formed of an elongated tube, the combustion gases leaving said combustion chamber are under a pressure above atmospheric at the chamber outlet, and such will be the case if the combustion chamber outlet opens into the atmosphere. The combustion gases are under such a pressure and at such a temperature at the combustion chamber outlet that they will have higher velocities than the sound velocity of atmospheric air. Thus, the momentary efflux of the combustion gases from the combustion chamber 17 into the acceleration chamber 21 allows for a very low ejector effect, if at all, with the result that the air within acceleration chamber 21, supplied from the annular space or vibration chamber 23, will be compressed and accelerated in a piston-like manner. The gases ejected from the combustion chamber 17 into acceleration chamber 21 cannot flow therefrom at a velocity considerably higher than that of the air already contained in the latter. The front of these gases thus will extend into acceleration chamber 21, as a result of the increase in the pressure under which the gas therein already exists at the inlet of acceleration chamber 21 and as a result of the acceleration of the air thereby. Thusly will be formed a compression wave. Since the velocity of the front of this compression wave is above the sound velocity of the air, there cannot occur any substantial mixtures, which would require subsonic speed. The acceleration of air by a compression wave will take place in a piston-like manner and at a high efficiency with respect to the acceleration.

Additional air will be introduced into chamber 23 through valves 22 in quantities greater than the amount of combustion supporting air through valves 18 into combustion chamber 17. Thus the gases flowing from the acceleration chamber outlet will be at a relatively low temperature. Considering the friction losses within the jet engine, especially favorable results will be attained at an additional air-combustion supporting air ratio of approximately 2:6. Should it be desired to increase the acceleration of relatively large volumes of additional air into the annular space or vibration chamber 23, several combustion chambers 17 may be used together similar to the arrangement of the combustion chambers 26 in Figure 4, said combustion chambers to operate at equal frequencies and to open into the acceleration chamber 21. The number of combustions being $n$, the frequency of the natural vibration of the column with chamber 23 will be $n$ times the frequency of the combustions within a combustion chamber. The combustion chambers opening into acceleration chamber 21 operate at pulsations offset one against the other and are expressed in increments, the extent of this offsetting being in the ratio of $360°:n$. With an arrangement of $n$ combustion chambers and one vibration chamber wherein the frequency of the pulsation of the air column is $n$ times the frequency of a combustion chamber, there will be a decrease in the size of chamber 23, and of course 21, and a steadier flow of gases from the jet power plant. The specific structure of the valves constituting the plurality of valves 18 and 22 is of importance and will be more specifically defined hereinbelow, the specific valves being mechanically operated valves. The air introduced therethrough especially into the acceleration chamber will also act to cool the walls of the combustion chamber or chambers. The compensating storage tank 24 is of extreme importance especially for the application of the jet power plant as a jet propulsion means for airplanes, since the steadiness of the inflow, as against periodic flow, thereby made possible makes for less resistance of the plant while the plane is moving through the atmosphere.

During the period during which the air flows from 23 into the front portion of 21, the combustion chamber outlet will be surrounded by air in the direction towards the jet engine outlet. The formation of the igniting shock-wave at the outlet of the combustion chamber 17 will be momentarily influenced by the flow of air from chamber 23 in such a way that the frequency of the number of shock-waves occurring will be increased thereby allowing the use of more fuel mixture in the combustion chamber and thereby resulting in an increase in capacity of the jet engine.

The respective chambers of the apparatus shown in Figure 3 may be arranged in different lengths with changeable cross-sectional areas and may also be bent at various angles at various portions thereof. The apparatus of Figure 3 may be used in airplanes, in heating systems, and in turbines.

Figure 4:
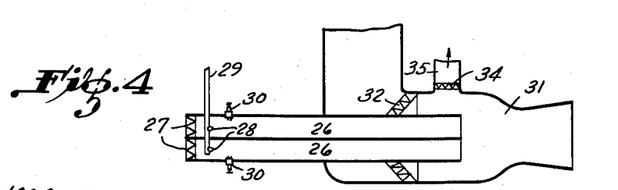
Figure 4 is a diagrammatic view through another embodiment of this invention and represents a combination of a plurality of tubular combustion chambers and a single acceleration chamber of a pulse jet engine, said acceleration chamber having means for withdrawing gases therefrom.

Referring to Figure 4, the apparatus therein shown consists of two similar combustion chambers 26, each having valves 27 at the respective inlet openings, fuel nozzles 28, fuel supply line 29, and the spark plugs 30, as clearly shown. At the respective outlets of combustion chambers 26 and surrounding the forward portions of said chambers 26 is acceleration chamber 31, the inlet thereof having there positioned the valves 32, while the outlet thereof is open, as clearly shown. Through line 33 will be introduced, past the valves 32, a gaseous medium. Also, forward of said valves 32 is positioned line 35 having at the inlet thereof the control valves 34. One portion of the gaseous medium from acceleration chamber 31 will be discharged through control valves 34 and through line 35 at increased pressure, as shown by arrow C. The combustion gases flowing from chambers 26 into the acceleration chamber 31 will also be at said increased pressure.

Figure 5:
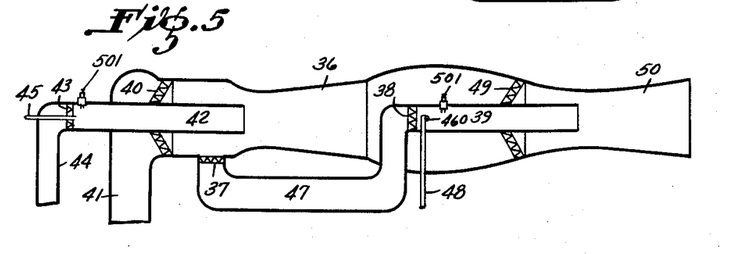
Figure 5 is a diagrammatic view through another combustion chamber-acceleration chamber combination for a pulse jet engine, said combination comprising one combustion chamber-acceleration chamber arrangement connected behind another combustion chamber-acceleration chamber whereby a portion of the oxygen-containing combustion supporting gas from the acceleration chamber of one arrangement will pass into the combustion chamber of the other arrangement.

Referring to Figure 5, acceleration chamber 36 is so positioned to surround spaced apart combustion chambers 39 and 42. From acceleration chamber 36 will pass an oxygen containing portion of gaseous medium introduced thereinto through control valves 40 into combustion chamber 39 through control valves 37, line 47, and control valves 38, said combustion chamber having an outlet opening into acceleration chamber 50, as clearly shown in Figure 5. From combustion chamber 42 the combustion gases formed therein will pass into acceleration chamber 36. The combustion chamber 42 has at its inlet opening valves 43, through which valves flow combustion supporting gas, which may be air or any other oxygen containing gas, said gas passing through said valves 43 from tube 44. The fuel is introduced into combustion chamber 42 through line 45 having at the end thereof and positioned within said combustion chamber 42 the nozzle 46. Also positioned within each of said combustion chambers 39 and 42 are the spark plugs 501, as clearly shown. The fuel will be introduced into combustion chamber 39 through line 48 and through the nozzle 460 at the end thereof and positioned within said combustion chamber.

The combustion gases flowing from the outlet of combustion chamber 42 will be introduced into acceleration chamber 50 through the inlet opening thereof, said inlet opening being controlled by the plurality of valves 49. The heat energy of these combustion gases will be increased within acceleration chamber 50 by the addition thereto of the heat energy of the combustion gases flowing from combustion chamber 39 also into acceleration chamber 50.

The heat energy content of the fuel mixture used in combustion chamber 42 is half of the normal heat energy value of a fuel mixture usually used in compression type combustion motors, this value usually being under normal conditions approximately 600 kilocalories per kilo of the mixture. By using such a fuel mixture having a relatively low heat energy content, there must be produced combustion gases under a pressure and a temperature considerably lower than normal. However, by using set forth combination of acceleration chambers and combustion chambers as shown in Figure 5, there are produced large gas volumes at increased pressures and lower temperatures. Thus there is obtained increased resulting energy by utilization of constant-volume combustion of a fuel mixture resulting from shock-wave-ignition plus additional combustion supporting gas, and this is so even though the fuel mixture used in combustion chamber 42 has a heat energy value lower than half the heat energy value of the fuel mixture usually used in internal combustion motors. Thus it is possible to utilize the apparatus of Figure 5 as a power source in a turbine which, as a result thereof, may be smaller in size.

Figure 14:
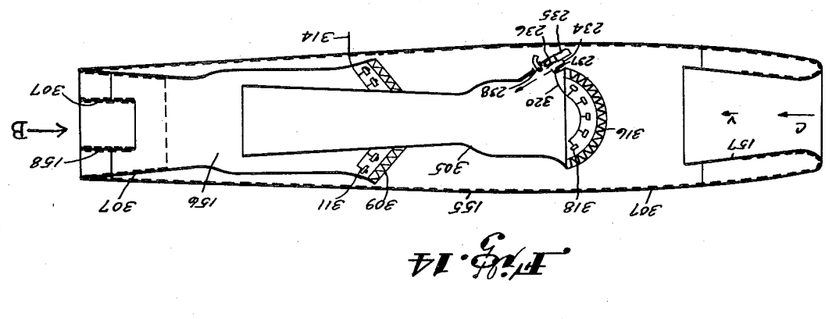
Figure 14 is a diagrammatic view through another embodiment of a pulse jet engine in which the walls of the component portions thereof are provided with sound- and shock-wave-absorbing materials.
Figure 15:
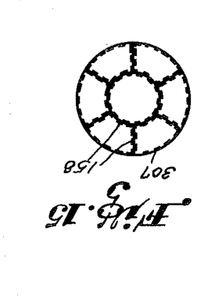
Figure 15 is a view of the pulse jet engine of Figure 14 taken in the direction of arrow B.

As a result of the operation of a pulse jet engine having therein the combination of combustion and acceleration chambers, there results a considerable noise, which noise is decreased by the inclusion of sound-wave and shock-wave absorbing substances on the walls, or a portion of the walls, of the acceleration chamber. Referring to Figures 14 and 15, Figure 14 represents a pulse jet engine utilized in relatively slowly flying airplanes, for example, those flying at subsonic speed. The absorbing coating 307 here is shown by the heavy broken lines and is used to cover the inner wall surface of the compensating storage tank or storage hood 155 surrounding said combination of combustion chamber 305 and acceleration chamber 156. At the inlet opening of said hood 155 and integral therewith and positioned within said hood is nozzle-like structural portion 157 which, on one hand, causes the atmospheric air to flow thereinto in a steady stream and, on the other hand, prevents the exit therefrom of sound-waves and shock-waves. Thus, the flow velocities shown in Figure 14 as $c$ and $v$ will be favorably selected by making said nozzle 157 of such dimensional cross-sectional area that they will be in a predetermined proportion with respect to the sound velocity of the air. The relationship used, designating the sound velocity of the air to be $a$, is $c^2 = av$. At the outlet opening of acceleration chamber 156 are positioned walls 158 also coated with absorbing material 307, as clearly shown in Figures 14 and 15. It is also preferable to coat a portion, at least, of the inner walls of the acceleration chamber 156 with said absorbing substances 307, as clearly shown in Figure 14. This is so for the reason that with relatively slow airplanes, noise suppression as well as engine efficiency are of extreme importance, since such airplanes usually fly at relatively low heights and take off and land in relatively crowded areas.

At the inlet opening of acceleration chamber 156 directly behind its inlet valves 309 are positioned several spaced apart nozzles 311 connected to line 314 through which is introduced fuel into the air passing through valves 309 into said acceleration chamber 156. Thus, there will be formed a fuel-air mixture which will be ignited by the hot combustion gases flowing from combustion chamber 305 at its outlet opening. Thus, there will be an increase of the thrust force resulting, which is desirable for the control of the plane while landing and at its take off.

At the inlet opening of combustion chamber 305 are positioned control valves 316, and within said combustion chamber 305 adjacent said control valves 316 are positioned fuel nozzles 318 connected to fuel line 320, through which line into said nozzles is passed intermittently fuel. The means for initiating the combustions consist of the casing 234 having inlet line 235 for receiving thereinto a combustion supporting gas such as air. Within said casing is positioned spring blade 236 surrounded by said air, fuel line 237 and the incandescent wire 238 with flow ducts. The introduction of air through line 235 causes spring blade 236 to vibrate. The frequency of said vibrations corresponds to the desired frequencies of combustions within combustion chamber 305. Introduction of fuel through nozzle 237 followed by heating of wire 238 causes the combustion of the fuel mixture within said combustion chamber 305, with the result that there will be a periodic efflux of combustion gases from said combustion chamber. The fuel gas, being periodically introduced into said combustion chamber as hereinbefore described, will make for a periodic efflux of combustion gases from the combustion chamber.

The valves utilized at the inlet openings of the combustion chambers and the acceleration chambers hereinbefore described may be of several types and will be hereinbelow more fully described.

Figure 12:
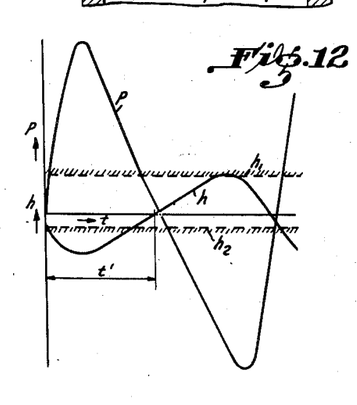
Figure 12 is a graph showing the pressure change occurring during a certain time period within the combustion chamber and also the oscillation of the controlling swinging valve of Figures 7, 8, and 9.

Figure 12 is a graph showing the pressure change occurring during a predetermined time period within a combustion chamber and also the oscillation of a controlling swinging valve of Figures 7, 8, and 9, hereinbelow more fully described. The abscissa $t$ indicates the time, and the line $p$ indicates the direction of the pressure within a combustion chamber, this pressure course usually being approximately harmonic. The values above the abscissa $t$ represent pressure above atmospheric while those below abscissa $t$ represent negative pressure. The edge of a valve controlling the valve cross-section acts under a force resulting from pressure $p$ and the spring force acting upon the vibrating valve part volume, said stroke being shown by line $h$. The distance $t'$ represents the phase shift between the pressure direction $p$ and the stroke course $h$, as clearly shown. The phase shift between curves $p$ and $h$ is somewhat smaller than half of the value of a full period of the pressure $p$, and the pressure rise is usually more rapid at the start of a combustion than it is subsequently. With respect to the cross-section of the control valve, it is advisable to have the valve shut prior to the start of the combustion. Thus, it is seen that the inlet cross-section of the valve should be selected in such a way that the valve closing occurs when the pressure of the gas within the combustion chamber is at a pressure higher than atmospheric, and it should be open to allow air to flow into the combustion chamber after the initial combustion will have started and the pressure of the gases therein will be lower. Thus, it is seen that the opening cross-sectional area of the valve is indicated by the broken-lined hatched straight lines $h_1$ and $h_2$.

Figure 13:
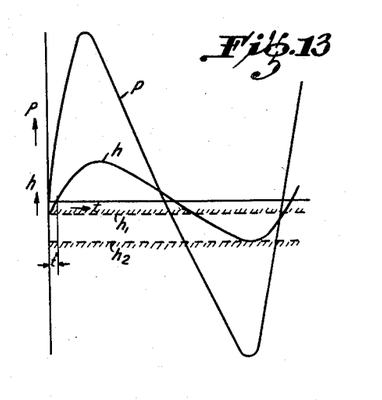
Figure 13 is a graph showing the pressure change occurring during a certain time period within the combustion chamber and also the oscillation of the controlling swinging valve of Figures 10 and 11.

Referring to Figure 13, here is shown a graph indicating the pressure change occurring during a predetermined time period within the combustion chamber and also the oscillation of a controlling swinging valve, more particularly the valves shown in Figures 10 and 11 hereinafter fully described, said graph having thereon descriptive letters similar to those on Figure 12. This graph, more particularly, refers to a valve having an actuating spring member thereby making for a larger number of natural vibrations of said valve than the number of frequencies of combustions in the related combustion chamber. The phase shift $t'$ caused by damping is, of course, very small. The opening of the valve, as indicated by straight lines $h_1$ and $h_2$, is somewhat smaller than that shown in Figure 12, but the closing of the valve includes the total superpressure range of curve $p$.

Now, in the construction of any pulse jet engine including a combustion chamber and an acceleration chamber, it is of extreme importance that the respective inlet openings of said chambers be closed at some time during the operation of said engine, that is, at least, during the specific period in which the combustion takes place within the combustion chamber. Here, valves of such a structure are utilized that they will open at the proper required instant and will close when required. The valves here used and hereinafter described, are of such structure that when open they will allow a free flow of the gas passing therethrough and when closed, will shut off the respective space from the outside. The valves are operated entirely in accordance with and by the gas acting thereagainst. In other words, the valves are operated by means of the fluctuating pressures.

Figure 6:
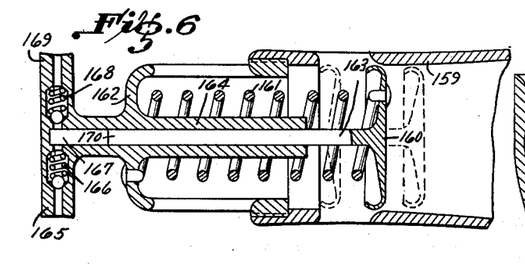
Figure 6 is a sectional view through one embodiment of the valve means comprising a straight-line vibrating valve plate.

Referring to Figure 6, therein is shown a valve means having a straight-line vibrating valve plate. The circular cross-section 159 is the inlet opening for a combustion chamber positioned to the right (not shown). Valve plate 160 is integral with valve shaft 163 and moves to the position as shown by the broken lines in accordance with the movement of valve shaft 163 within case 164. Spring member 161 is positioned about shaft 163, which is slidable within case 164. One end of said spring is connected to the supporting wall 162 and the other end of said spring, of course, is connected to valve plate 160. The plate then vibrates, as indicated in Fgure 12 by curve $h$. The fuel enters through tube 165, having positioned therein globe valve 166, the cylindrical chamber 167 and the fuel is discharged through globe valve 168 through branch 169. The reciprocating movement of the frontal area 170 of shaft 163 causes the movement of the fuel, as set forth. Where inlet openings are relatively large in cross-sectional area, several of the aforedescribed structures are connected in parallel with respect to the valve plate 160.

Figure 7:
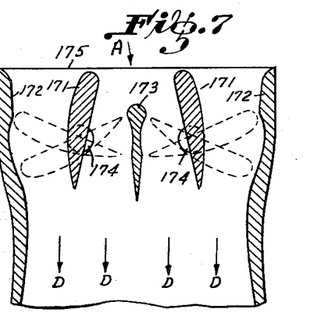
Figure 7 is a sectional view through a plurality of freely oscillating rotary flap valves.
Figure 8:
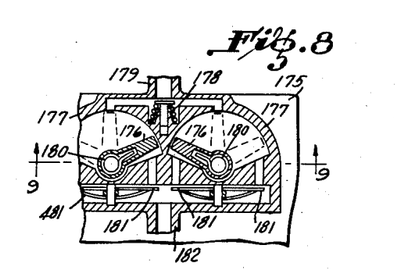
Figure 8 is a top view taken in the direction of arrow A of the valve of Figure 7.
Figure 9:
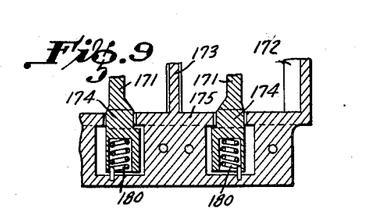
Figure 9 is a sectional view on line 9—9 of Figure 8.

Referring to Figures 7, 8, and 9, therein are shown a plurality of freely oscillating rotary flap valves which vibrate freely in accordance with the showing in Figure 12. Two rotary flap members 171 are positioned at the inlet opening 172 of a combustion chamber (not shown). The direction of flow of the combustion supporting air is shown by arrows D. The position of said flaps 171, in closing position for the said combustion chamber, are shown by the broken lines. The flaps 171 have such a profile or shape determined in accordance with the principles of aerodynamics, that at the inflow of the gaseous medium to the chamber past said flaps, a torsional movement will act on each flap to attain the necessary rotation. In closing position, the ends of the flaps, on one hand, move along the arc shaped wall portions of walls 172 and, on the other hand, along the wall portions of intermediate fin 173. Said flaps are seated by means of journal members 174 which are positioned at both sides of the front surfaces of said flaps within the walls 175 of the valve casing therefor. The lower limiting wall 175 is clearly shown in Figure 7, and the second wall 175 is shown in Figure 8, Figure 8 being a top view of the valve casing. Two bed bolts 174 and wall 175 with the bedding for bolts 174 are shown in Figure 9. Connected to bed bolts 174 are rotatably mounted pistons 176, as clearly shown in Figure 8, within piston cylinders 177. Piston 176 act as sealing means within cylinders 177 with the result that the air within said cylinders will, in accordance with the vibration of said piston 176, be compressed periodically. By means of back pressure valve 178 said cylinders can be replenished with air through line 179 with the result that a certain pressure is always maintained. Each cylinder 177 is so arranged that, to a certain degree, it is capable of being rotated about the axis of a flap 171. Thus, it is possible to control the neutral position of the flap during vibration thereof. In addition, flap 171 is maintained in its rest position by means of an additional adjusting of spring 180, flap 171 can also be placed in starting position, as desired. Thus, said flap can be positioned as desired prior to initiating of a combustion within the combustion chamber, and said spring 180 does not influence flap 171 in vibrating in any measurable degree.

In order to permit the utilization of air within the piston cylinder 177 during operation of the engine, back pressure valves 181 are positioned at the bottom of each cylinder 177. The air will be conducted thusly through branch 182, as desired. The related pressure thus resulting is adjusted by means of the springs 481 of the valves 181 through which the gas or the air will pass as a result of the operation of the rotatably mounted piston 176. Thus, by withdrawing said air increased as to its pressure by the vibration of the flap, it is possible to change the degree of phase shift between existing pressure caused by the combustions and the vibration of the flap, as desired.

Figure 10:
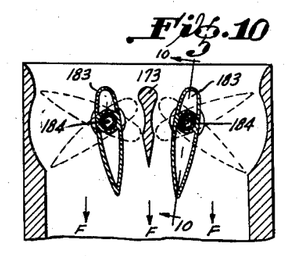
Figure 10 is a sectional view through another embodiment of a plurality of freely oscillating rotary flap valves.
Figure 11:
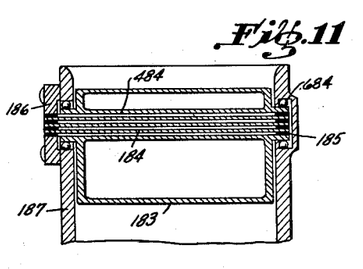
Figure 11 is a sectional view on line 10—10 of Figure 10.

Referring to Figures 10 and 11, therein are shown a plurality of rotatably mounted flap valves which oscillate freely in accordance with the showing of the graphical representation in Figure 13. The position of the flap valves 183 are shown in closed position by the broken lines. The direction of flow of the combustion supporting air through said valves into the combustion chamber is shown by arrows F. The movement of each flap 183 is damped by the plurality of relatively thin steel wires 184 positioned within the bore 484. In Figure 11, which is a longitudinal sectional view on line 10—10, is shown the plurality of said steel wires 184 joined, as by welding or soldering, at 185 to plate 186 which is connected to wall 187 of a valve. Also shown is the bedding of flaps 183 by means of ball bearings 684. In order to obtain a low moment of inertia, the walls of said flaps 183 have been made relatively thin.

In the jet pulse engine of this invention it is of extreme importance that the inlet openings of both the combustion chamber and of the acceleration chamber have positioned therein the aforesaid properly operating vibrating or oscillating valves.

Figure 16:
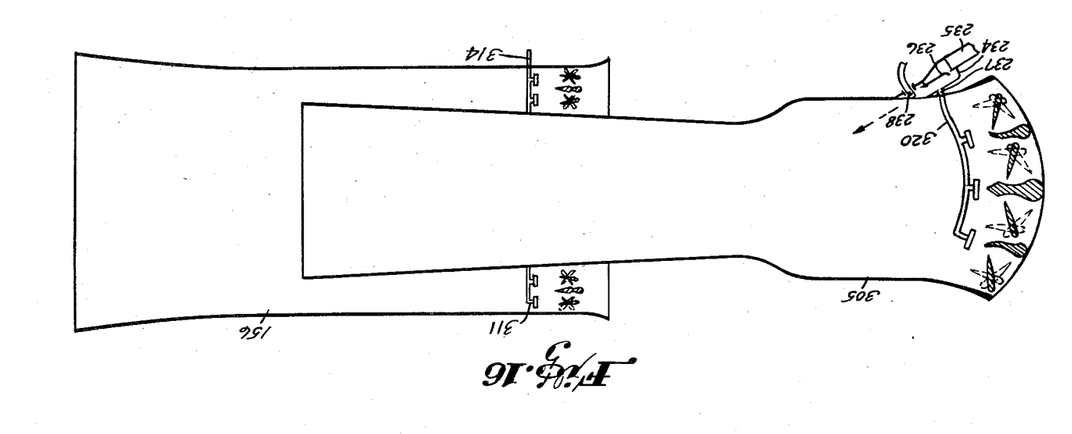
Figure 16 is a diagrammatic view through an embodiment of a combination of a combustion chamber and an acceleration chamber showing means for initiating intermittently repeated combustions within the combustion chamber by utilizing means for intermittently introducing an ignitable mixture at the outlet of the combustion chamber and rhythm with the combustions attained, said combination being utilized in the pulse jet engine of Figure 15.

Referring to Figure 16, therein is shown on a larger scale the combination of the acceleration chamber 156 and the combustion chamber 305 as shown in the pulse jet engine of Figure 14. However, in Figure 16 is shown more particularly the vibrating valves in combination with both the acceleration chamber and the combustion chamber at their respective inlet openings, said valves here being, for purposes of illustration only, similar to the valves of Figures 7, 8, and 9 hereinabove fully described.

Here, in this invention, I have disclosed a jet pulse engine comprising an acceleration chamber and a combustion chamber, said engine being one in which there is a constant-volume combustion within an open chamber and being one in which there are not any sliding pistons and unnecessary components usually associated therewith. Here, the initial combustion is started with an ordinary spark plug and the subsequent combustions are caused by means of shock-waves formed within the apparatus.

Many alterations and changes may be made without departing from the spirit and scope of this invention which is set forth in the appended claims, which are to be construed as broadly as possible in view of the prior art.

I claim:

1. In an internal combustion engine of the gas-jet type particularly for aircraft, the combination, comprising, an elongated combustion chamber having an inlet end and an open outlet end, said combustion chamber being of convergent-divergent shape, with the angle of divergence not more than 5°, means carried by the inlet end of the combustion chamber feeding thereinto intermittently separate charges of a starting fuel-air mixture, sparking means in the combustion chamber for igniting the mixture, valves mounted on the inlet end of the chamber and admitting fresh air into said chamber and reflecting pressure waves of the gases burned therein, means for supplying fuel to said combustion chamber, an acceleration chamber having an intermediate portion surrounding the combustion chamber outlet end in spaced relation thereto, said acceleration chamber having an outlet end portion subdivided by walls aligned with the flow direction and covered with material absorbing sound and shockwaves, means feeding into the acceleration chamber a second gas in separate charges and intermittently and in a phase relation opposite to that of the first mentioned feeding means, said last mentioned means comprising a second gas inlet disposed upstream of the outlet end portion of the combustion chamber and admitting the second gas and reflecting it toward the combustion chamber outlet and positioned at such a distance from the combustion chamber outlet end as to cause the vibration frequency of the second gas column to resonate with the burned gas leaving the combustion chamber outlet end, and tubular means surrounding the combustion chamber and acceleration chamber and admitting air at its front end to the inlets of both said chambers and sealingly connected at its rear end to the acceleration chamber to compel the air admitted at the front end to pass solely through the combustion chamber and acceleration chamber.

2. In an internal combustion engine of the pulsating jet type, the combination comprising an elongated combustion chamber having an inlet opening and an outlet opening at the respective ends thereof, means for intermittently supplying a starting fuel and combustion supporting gas mixture to said combustion chamber at a pressure higher than atmospheric, said supplying means being positioned adjacent to said inlet opening, means for igniting the so intermittently supplied mixture at said pressure, said igniting means being mounted in said combustion chamber adjacent said inlet opening, means for supplying the main fuel to the combustion chamber, valve means for intermittently admitting a combustion supporting gas into said combustion chamber through said combustion chamber inlet opening and for reflecting the pressure waves of the gases burned in said combustion chamber, whereby there results a periodic and pulsatory discharge of burned gases from said outlet opening of said combustion chamber, an elongated acceleration chamber, said acceleration chamber including an intermediate portion surrounding and extending beyond said outlet opening of said combustion chamber, said acceleration chamber having an inlet opening and an outlet opening at its respective end portions, means for supplying a combustion supporting gas to said acceleration chamber at its inlet opening, valve means controlling said inlet opening for admitting combustion supporting gas into said acceleration chamber in timed relation to the periodic discharge of burned gases from said combustion chamber at its outlet opening and in accordance with the difference in pressures on both sides of said valve means and for reflecting pressure waves created in said acceleration chamber, said valve means being spaced upstream from said outlet opening of said combustion chamber at such a distance that the combustion supporting gas between the inlet opening of the acceleration chamber and the outlet opening of the combustion chamber pulsates with a natural frequency equal to the frequency of pressure impulses received from the periodic discharges of the burned gases from said outlet opening of said combustion chamber.

3. In an internal combustion engine of the pulsating jet type, the combination comprising an elongated tubular combustion chamber having at one end thereof an inlet means for receiving therethrough air and an outlet means at the other end thereof for discharging therefrom jets of burned gases under pressure, means for intermittently supplying a starting fuel and air gas mixture to said combustion chamber at a pressure higher than atmospheric, said supplying means being positioned adjacent to said inlet means, sparking means for initially igniting the intermittently supplied mixture, whereby combustion gases are formed and caused to pass towards said combustion chamber outlet means, valve means for intermittently admitting portions of air into said combustion chamber through said combustion chamber inlet means and for reflecting pressure waves of gases burned in said combustion chamber, means for supplying the main fuel to the combustion chamber, whereby subsequent charges of the fuel and air mixture are drawn into said combustion chamber and are ignited by shock waves therein, an elongated tubular acceleration chamber including an intermediate portion surrounding and extending beyond the outlet means of said combustion chamber and in the direction of the axis thereof, said acceleration chamber having an inlet means at one end for receiving air therethrough and an outlet opening at the other end thereof, valve means controlling said inlet means for intermittently admitting air into said acceleration chamber in timed relation to the periodic discharge of burned gases from said combustion chamber at its outlet opening and in accordance with the difference in pressures on both sides of said valve means and for reflecting pressure waves created in said acceleration chamber, said valve means including plate members freely oscillating about a central point, said valve means being spaced upstream from said outlet means of said combustion chamber at such a distance that the gas column in said acceleration chamber between said acceleration chamber inlet and said combustion chamber outlet pulsates at its natural frequency equal to the frequency of the pressure impulses of the burned gases discharged from said combustion chamber.

4. In an aircraft internal combustion engine of the gas-jet type, the combination comprising an elongated tubular combustion chamber having at one end thereof an inlet means for allowing air to pass therethrough and an outlet means for periodically discharging therefrom burned gases under pressure, means for intermittently supplying a starting fuel and air mixture to said combustion chamber at a pressure higher than atmospheric, said supplying means being positioned adjacent to said inlet means, sparking means for igniting the so intermittently supplied mixture, whereby combustion gases are formed and caused to pass towards said combustion chamber outlet means, valve means for opening and closing at least a portion of said combustion chamber inlet means for intermittently admitting charges of air into said combustion chamber and for reflecting pressure waves of burned gases formed within said combustion chamber, said valve means being mounted at said inlet opening, means for supplying the main fuel to the combustion chamber, whereby subsequent charges of the fuel and air mixture are drawn into said combustion chamber and are ignited by shock waves therein, an elongated tubular acceleration chamber including an intermediate portion surrounding and extending beyond the outlet means of said combustion chamber and in the direction of the axis thereof, said acceleration chamber having an inlet means for receiving air therethrough and an outlet opening at the other end thereof, valve means for alternately opening and closing a large cross-sectional area of said acceleration chamber inlet means, thereby intermittently admitting large quantities of air to said acceleration chamber, and for reflecting pressure waves in said acceleration chamber, said valve means including means for automatically operating same by differences of gas pressures on both sides thereof, said valve means being spaced upstream from said combustion chamber outlet means at such a distance that the gas column in said acceleration chamber between said acceleration chamber inlet and said combustion chamber outlet pulsates at its natural frequency equal to the frequency of the pressure impulses of the burned gases discharged from said combustion chamber, and a tubular member surrounding both said combustion chamber and said acceleration chamber, said tubular member having an inlet opening at one end thereof spaced from said combustion chamber inlet opening and said acceleration chamber inlet opening and being sealingly connected at its other end thereof to said acceleration chamber at the outer wall surface thereof, whereby air passes through said tubular member inlet opening and thence through said combustion chamber and acceleration chamber inlet openings to operate the respective valve means attached to said chambers at their respective inlet openings in accordance with the pressures existing on both sides of each valve means.

References Cited in the file of this patent

UNITED STATES PATENTS

| | | |
|---|---|---|
| 735,007 | Watson | July 28, 1903 |
| 2,500,712 | Serrell | Mar. 14, 1950 |
| 2,543,758 | Bodine | Mar. 6, 1951 |
| 2,574,460 | Bohanon | Nov. 13, 1951 |
| 2,593,523 | Bauger | Apr. 22, 1952 |
| 2,612,722 | Tenney | Oct. 7, 1952 |
| 2,613,496 | Kollsman | Oct. 14, 1952 |
| 2,650,472 | Mansfield et al. | Sept. 1, 1953 |

FOREIGN PATENTS

| | | |
|---|---|---|
| 345,486 | France | Oct. 17, 1904 |
| 176,838 | Great Britain | Mar. 6, 1922 |
| 424,955 | Great Britain | Dec. 1, 1933 |

OTHER REFERENCES

"Project Squid," T. M. No. P. R.-4, "The Aeroresonator Power Plant of the V-1 Flying Bomb," by Diedrich, June 30, 1948, Princeton University, 72 pages, pages 7, 13, 35, 41 and 42 relied on.